3,501,469
SYNTHESIS OF 2-AMINO-s-TRIAZINE
William G. Billings, Bartlesville, Okla., assignor to Phillips
  Petroleum Company, a corporation of Delaware
No Drawing. Filed Feb. 19, 1968, Ser. No. 706,627
            Int. Cl. C07d 55/18
U.S. Cl. 260—249.5                            4 Claims

ABSTRACT OF THE DISCLOSURE 2-amino-s-triazine is prepared by the reaction of guanidine carbonate and formamide in the presence of an acidic medium.

BACKGROUND OF THE INVENTION

Triazine compounds are known to be useful for a variety of purposes due to their herbicidal and fungicidal properties. 2-amino-s-triazine is particularly useful as a rust inhibitor and as an antigelling agent. In addition, it is known that this compound possesses acaracidal activity. In view of the useful properties of the 2-amino-s-triazine, it is desirable to provide a simple and economical process for its preparation.

THE INVENTION

It is thus an object of the present invention to provide a novel and economical process for the production of 2-amino-s-triazine.

Other aspects, objects and the several advantages of this invention will be apparent from the following specification and claims.

In accordance with this invention, I have discovered that 2-amino-s-triazine can be readily produced by the reaction of guanidine carbonate and formamide in the presence of an acidic medium.

The process of this invention is carried out at a temperature in the range of 30 to 100° C., preferably from 45 to 60° C. The reaction can be carried out over a period of 0.1 hour to 10 hours, although the preferred period for completion of the process is in the range of 1 to 5 hours.

The reaction is carried out in an acidic medium. Examples of such reaction media include sulfuric acid, sulfonated aromatic oils, benezenesulfonic acid, toluenesulfonic acid and other known aromatic sulfonic acids. In addition, other acids such as acetic acid or mineral acids may be used as the reaction medium.

Generally from 3 to 25 parts by weight of guanidine carbonaate are employed in the reaction per 100 parts by weight of formamide, but proportions outside of this range are operable.

The process is preferably carried out by first forming a slurry of the formamide and guanidine carbonate and thereafter adding an acidic medium to the slurry while agitating same. The mixture is maintained at a temperature of 30 to 100° C. until evolution of carbon dioxide ceases. Thereafter the resulting mixture is maintained at a temperature in the range of 30 to 100° C. for a period of 1 to 5 hours. However, periods outside of this preferred range can also be utilized if desired.

The resulting 2-amino-s-triazine is thereafter recovered by any method known to the art such as by distillation of the reaction mass under vacuum or in the presence of an inert gas stream, under conditions such that no substantial decomposition of the desired product occurs.

The preferred acidic medium for use in carrying out the process of this invention is a sulfonated aromatic oil obtained by the sulfonation of a solvent refined, dewaxed lubricating oil fraction derived from Mid-Continent Petroleum and having the following properties: viscosity of 4278 SUS at 100° F.; viscosity of 203 SUS at 210° F. and a viscosity index of 93. In one mode of operation, this charge stock is sulfonated with 20 weight percent oleum in a continuous operation using an acid to oil ratio of 0.4 and a temperature of 140° F. Other modes of sulfonation are described, for example, in U.S. 3,135,693, issued June 2, 1964.

In using concentrated sulfuric acid as the acidic reaction medium, one ml. concentrated sulfuric acid per two grams of guanidine carbonate in the slurry is preferred, although 0.9 to 1.1 ml. concentrated sulfuric acid per two grams guanidine carbonate may be used.

The following examples will further illustrate the invention but are not intended to be limiting thereto.

EXAMPLE I

Concentrated sulfuric acid (96 weight percent) was added dropwise to a stirred slurry consisting of 226 grams of formamide and 18 grams of guanidine carbonate maintained at a temperature of about 50° C. Acid addition was continued for about 15 minutes until evolution of $CO_2$ ceased. The resulting solution was thereafter stirred for 2 hours while the temperature thereof was maintained at 50° C. and then distilled under reduced pressure (25 mm. Hg). The distillate recovered at 180° C., and which consisted of a mixture of 2-amino-s-triazine in formamide, was cooled to room temperature. The resulting precipitated 2-amino-s-triazine was recovered and thereafter recrystallized from a 50:50 (by volume) ethanol/chloroform mixture. The recrystallized compound had a melt point of 222–225° C.

EXAMPLE II

A total of 900 grams of sulfonated aromatic oil described hereinbefore was added slowly to a slurry consisting of 100 grams of guanidine carbonate and 1160 grams of formamide. The slurry was stirred during the addition of the sulfonated aromatic oil and maintained at a temperature of about 50° C. After addition of the aromatic oil, agitation of the resulting mixture was continued for 4 hours while maintaining the temperature at 60° C. The reaction mixture was then transferred to a 5-liter flask and heated at 180° C. under 10 mm. Hg pressure. A stream of natural gas was passed therethrough and 2-amino-s-triazine was collected in a sublimitation tube. The recovered material was recrystallized from a 50:50 mixture of ethanol/chloroform. The resulting compound had a melt point of 222–225° C.

A comparison of the infrared spectrum of the products obtained from both Examples I and II with that of a known sample of 2-amino-s-triazine showed the products to be identical therewith.

Reasonable variations and modifications are possible within the scope of the foregoing disclosure and the appended claims to the invention.

I claim:
1. A process for producing 2-amino-s-triazine which comprises heating a mixture of guanidine carbonate and formamide in the presence of an acidic medium and thereafter recovering the 2-amino-s-triazine as a product of the process.
2. A process according to claim 1 wherein the reaction is carried out at a temperature in the range of 30 to 100° C.
3. A process according to claim 1 wherein said acid medium is sulfuric acid.
4. A process according to claim 1 wherein said acidic medium is a sulfonated aromatic oil.

References Cited

UNITED STATES PATENTS 2,408,694  10/1946  Simons et al. __ 260—249.9 XR
2,571,911  10/1951  Marsh _____ 260—249.5 XR HENRY R. JILES, Primary Examiner
JOHN M. FORD, Assistant Examiner